US012432798B2

(12) United States Patent
Liu et al.

(10) Patent No.: US 12,432,798 B2
(45) Date of Patent: Sep. 30, 2025

(54) DATA RADIO BEARER CONTROL METHOD, DEVICE AND SYSTEM FOR MULTI-CONNECTION SYSTEM

(71) Applicant: ZTE CORPORATION, Guangdong (CN)

(72) Inventors: Hongjun Liu, Guangdong (CN); Wei Ma, Guangdong (CN); Boshan Zhang, Guangdong (CN); Wu Wen, Guangdong (CN); Dongmei Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 499 days.

(21) Appl. No.: 17/611,145

(22) PCT Filed: May 12, 2020

(86) PCT No.: PCT/CN2020/089693

§ 371 (c)(1),
(2) Date: Nov. 13, 2021

(87) PCT Pub. No.: WO2020/228686

PCT Pub. Date: Nov. 19, 2020

(65) Prior Publication Data

US 2022/0256629 A1 Aug. 11, 2022

(30) Foreign Application Priority Data

May 13, 2019 (CN) ......................... 201910397354.7

(51) Int. Cl.
*H04W 76/15* (2018.01)
*H04W 28/02* (2009.01)
*H04W 28/24* (2009.01)

(52) U.S. Cl.
CPC ....... *H04W 76/15* (2018.02); *H04W 28/0268* (2013.01); *H04W 28/24* (2013.01)

(58) Field of Classification Search
CPC . H04W 76/15; H04W 28/0268; H04W 28/24; H04W 76/11; H04W 76/12;
(Continued)

(56) References Cited

U.S. PATENT DOCUMENTS

2018/0324631 A1 11/2018 Jheng et al.
2019/0082361 A1* 3/2019 Nylander ................ H04W 4/20
(Continued)

FOREIGN PATENT DOCUMENTS

CN 108377567 A 8/2018
CN 109246757 A 1/2019
(Continued)

OTHER PUBLICATIONS

WIPO, International Search Report issued on Aug. 1, 2020.
(Continued)

*Primary Examiner* — Yaotang Wang
(74) *Attorney, Agent, or Firm* — Li & Cai Intellectual Property (USA) Office

(57) ABSTRACT

Provided are a data radio bearer control method, device, and system for a multi-connection system. The data radio bearer control method for a multi-connection system comprises: establishing a split protocol data unit session comprising M quality of service flows, the M quality of service flows being respectively established on N radio access network nodes, wherein one of the N radio access network nodes is a master node, and N−1 radio access network nodes other than the master node among the N radio access network nodes are secondary nodes, M and N are positive integers, and M≥2 and N≥2; and establishing a default data radio bearer for the split protocol data unit session, and configuring the default data radio bearer on any one of the radio access network nodes.

16 Claims, 4 Drawing Sheets

Establish split protocol data unit session including M quality-of-service flows, M quality of service flows being established on N radio access network nodes, wherein one of N radio access network nodes is master node, N-1 radio access network nodes other than master node among N radio access network nodes are secondary nodes, where M and N are positive integers, and M≥ 2 and N≥ 2

S3010

Establish default data radio bearer for the split protocol data unit session, and configure the default data radio bearer on any one of radio access network nodes.

S3020

(58) Field of Classification Search
CPC .. H04W 76/10; H04L 41/0806; H04L 5/0053; H04L 41/0803
See application file for complete search history.

(56) References Cited

U.S. PATENT DOCUMENTS

| | | | | |
|---|---|---|---|---|
| 2020/0322831 | A1* | 10/2020 | Xu | H04W 28/0268 |
| 2022/0124846 | A1* | 4/2022 | Wang | H04W 28/0236 |

FOREIGN PATENT DOCUMENTS

| | | | |
|---|---|---|---|
| CN | 109587825 | A | 4/2019 |
| CN | 110536484 | A | 12/2019 |
| EP | 3637846 | A1 | 4/2020 |

OTHER PUBLICATIONS

Qualcomm Incorporated, "Flow-DRB binding", 3GPP TSG-RAN WG2 Meeting #97, Feb. 17, 2017.
European Patent Office, EP20806589.6 Extended European Search Report issued on Dec. 21, 2022.
Huawei, et al., "Default DRB coordination in late drop", 3GPP Draft, May 3, 2019.
Huawei, et al., "Default DRB coordination for MR-DC", 3GPP Draft, Apr. 6, 2019.
Huawei, et al., "CR on 38.331 default DRB coordination in late drop", 3GPP Draft, May 3, 2019.
Huawei, et al., "Default DRB coordination in MR-DC over Xn", 3GPP Draft, Apr. 15, 2019.

* cited by examiner

DATA RADIO BEARER CONTROL METHOD, DEVICE AND SYSTEM FOR MULTI-CONNECTION SYSTEM

This application claims the priority of a Chinese patent application No. 201910397354.7 filed with the China National Intellectual Property Administration on May 13, 2019, the entire content of which is incorporated into this application by reference.

TECHNICAL FIELD

This disclosure relates to the field of communications, and for example, to a data radio bearer control method, device, and system for a multi-connection system.

BACKGROUND

A mobile communication system includes User Equipment (UE) and network equipment. The network equipment includes two types of equipment, which are Radio Access Network (RAN) and Core Network (CN). In the fifth generation mobile communication (5th Generation, 5G) system, a multi-connection system is proposed. The UE can establish two or more user plane connections with the CN through two or more RANs. The user plane data in the form of quality of service flow (Qos Flow, QF) belongs to a certain Protocol Data Unit Session (PDU Session). The PDU Session of a UE can be split and sent to the CN through two or more RANs. One of the two or more RANs is a Master Node (MN) and the other(s) is a Secondary Node (SN).

After the CN sends the data in the form of QF to the RAN, the RAN maps the QF into a data radio bearer (DRB) and sends it to the UE, and maps the data sent from the UE through the DRB into the QF and sends it to the CN. In the multi-connection system, after a PDU Session is split, it cannot be known which DRB the RAN maps the QF to, so that the UE can only transmit the QF borne on the default DRB. When the MN configures a certain QF of the split PDU Session at the MN node and sends it to the CN but configures the default DRB at the SN, the CN can only learn that the received QF comes from uplink address of the MN, which may have impact on the QF sent from the SN.

SUMMARY

The present disclosure provides a data radio bearer control method, device and system in a multi-connection system, which can avoid the impact of a split PDU session on the QF sent from the SN.

In an embodiment of the disclosure, there is provided a data radio bearer control method in a multi-connection system, including: establishing a split protocol data unit session including M quality-of-service flows, the M quality-of-service flows being established on N radio access network nodes, wherein one of the N radio access network nodes is a master node, N−1 radio access network nodes other than the master node among the N radio access network nodes are secondary nodes, where M and N are positive integers, and M≥2 and N≥2; and establishing a default data radio bearer for the split protocol data unit session, and configuring the default data radio bearer on any one of radio access network nodes.

In an embodiment of the disclosure, there is provided a data radio bearer control method in a multi-connection system, including: receiving a configuration notification message sent from a master node, the configuration notification message including configuration information of a default data radio bearer corresponding to a split protocol data unit session, the split protocol data unit session including M quality-of-service flows, the M quality-of-service flows being established on N radio access network nodes, wherein one of the N radio access network nodes is the master node, and N−1 of the N radio access network nodes other than the master node are secondary nodes, where M and N are positive integers, M≥2 and N≥2; and determining uplink addresses of the N radio access network nodes and M quality-of-service flow identifiers of the split protocol data unit session.

In an embodiment of the disclosure, there is provided a data radio bearer control device in a multi-connection system, including: a session split module, configured to establish a split protocol data unit session including M quality-of-service flows, the M quality-of-service flows being established on N radio access network nodes, wherein one of the N radio access network nodes is a master node, N−1 radio access network nodes other than the master node among the N radio access network nodes are secondary nodes, where M and N are positive integers, and M≥2 and N≥2; and a bearer establishment module, configured to establish a default data radio bearer for the split protocol data unit session and configure the default data radio bearer on any one of the N radio access network nodes.

In an embodiment of the disclosure, there is provided a data radio bearer control device in a multi-connection system, including: a receiving module, configured to receive a configuration notification message sent from a master node, the configuration notification message including configuration information of a default data radio bearer corresponding to a split protocol data unit session, the split protocol data unit session including M quality-of-service flows, the M quality-of-service flows being established on N radio access network nodes, wherein one of the N radio access network nodes is a master node, and N−1 of the N radio access network nodes other than the master node are secondary nodes, where M and N are positive integers, M≥2 and N≥2; and a determining module, configured to determine uplink addresses of the N radio access network nodes and M quality-of-service-flow identifiers of the split protocol data unit session.

In an embodiment of the disclosure, there is provided a data radio bearer control device in a multi-connection system, including: a receiving module, configured to receive default data radio bearer establishment instruction information, the default data radio bearer establishment instruction information including information of a secondary node configured with a default data radio bearer; and a sending module, configured to send uplink information in a split protocol data unit session through a data link to the secondary node configured with the default data radio bearer.

In an embodiment of the disclosure, there is provided a data radio bearer control system in a multi-connection system, wherein the data radio bearer control system in the multi-connection system comprises N radio access network nodes, wherein one of the N radio access network nodes is a master node, and N−1 radio access network nodes other than the master node among the N radio access network nodes are secondary nodes; the master node includes the data radio bearer control device in a multi-connection system on the master node side according to any one of embodiments of the disclosure; and the secondary node includes the data radio bearer control device in a multi-connection system on the secondary node side according to any of embodiments of the disclosure.

DETAIL DESCRIPTION OF EMBODIMENTS

Hereinafter, the embodiments of the present application will be described in detail with reference to the accompanying drawings.

Figure 1:
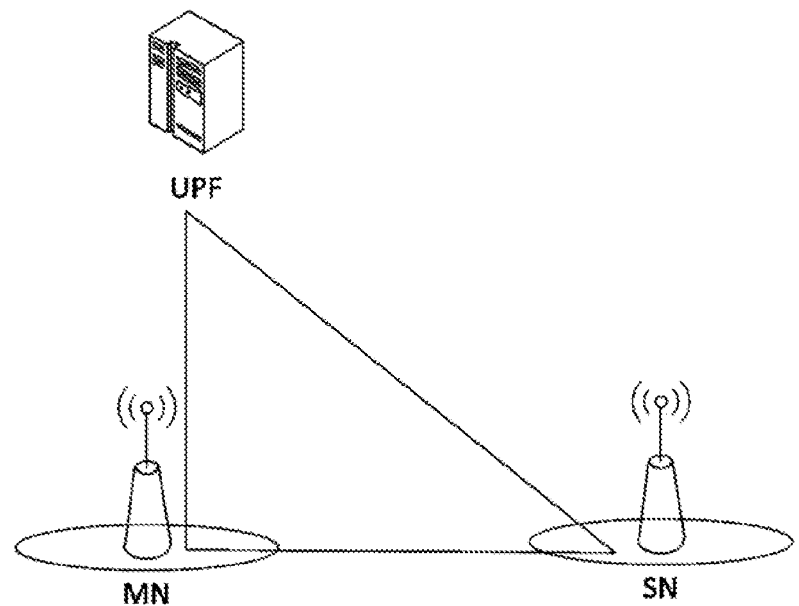
FIG. 1 is a schematic diagram of a dual connection system.

In the 5G system, CN refers to the 5G Core Network (5G Core, 5GC), including: Access and Mobility Management Function (AMF), User Plane Function (UPF), and System Management Function (SMF) and other network elements. In a multi-connection system, the UE establishes two or more user plane connections with network device. In this application, taking the dual connection is taken as an example, as shown in FIG. 1 which is a schematic diagram of the dual connection system. The CN (i.e., UPF network element of the core network) establishes user plane connection with two respective cell groupings of the RAN. At this time, the RAN includes a Master node (MN) and a Secondary node (SN). FIG. 1, by taking the dual connection system as an example, shows a single MN and a single SN. However, in a multi-connection system with more than two RANs, there is only a single MN, and the other RANs other than MN are SNs.

Figure 2A:
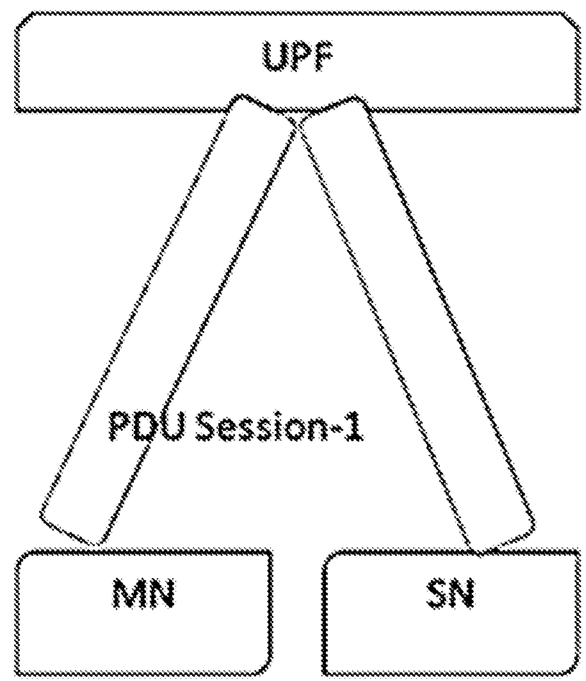
FIGS. 2A and 2B are schematic diagrams of QoS architecture.
Figure 2B:
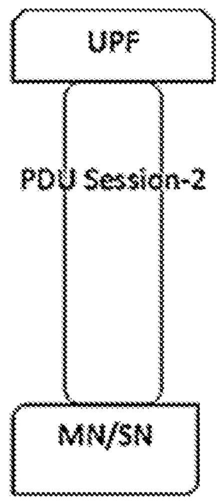

FIGS. 2A and 2B are schematic diagrams of the Quality of Service (QoS) architecture. In the QoS architecture of 5GC, user plane data in the form of Quality of Service Flow (QoS Flow, QF) belongs to a Protocol Data Unit Session (PDU Session). Each QF uses a QoS Flow ID identifier, referred to as QFI. A PDU Session includes at least one QF, and a UE establishes at least one PDU Session. For a certain PDU Session, the MN decides whether to diverge some of the QFs to the SN and which QFs to specifically diverge. When at least one QF in a PDU Session is transmitted in the MN and at least another QF is concurrently transmitted in the SN, this herein is called a split PDU Session, i.e., PDU Session-1, as shown in FIG. 2A. At this time, 5GC (UPF) establishes a GPRS Tunnel Protocol User (GTP-U) tunnel with MN and SN, respectively; otherwise, all QFs of a PDU Session are only transmitted on one network element, this herein is called a non-split PDU Session), i.e., PDU Session-2, as shown in FIG. 2B. At this time, the 5GC only establishes a GTP-U tunnel with the network element (MN or SN) transmitting the PDU Session.

One or more GTP-U tunnel can be established between the 5GC and the RAN for data transmission. In this application, each GTP-U tunnel is also referred to as a user plane connection. Each GTP-U tunnel includes a pair of uplink address and downlink address, which are: uplink user plane transport layer address (UL UP Transport layer address, "UPF endpoint of the NG-U transport bearer, for delivery of UL PDUs", herein referred to as uplink address) for transmitting data from the RAN to the CN, and downlink user plane transport layer address (DL UP Transport layer address, "UPF endpoint of the NG-U transport bearer, for delivery of DL PDUs", herein referred to as downlink address) for transmitting data from the CN to the RAN.

In a dual connection system, a part of the QFs in a session are configured in the MN, and other parts of QFs are configured in the SN. Correspondingly, on the CN side, the 5GC also allocates two uplink user plane addresses for the PDU Session, wherein one uplink address corresponds to the MN downlink address, and the other uplink address corresponds to the SN downlink address. In this way, the session establishes two user plane connections between RAN and 5GC, and two pairs of uplink address and downlink address. In one address pair (a pair of uplink address and downlink address), the downlink address is MN and the uplink address is 5GC address 1 which bears a part of QFs of the session. In the other address pair, the downstream address is SN and the uplink address is 5GC address 2 which bears other parts of QFs of the session.

After the 5GC and RAN are split, a part of the QFs of a PDU session is configured in the MN (referred to as QoS flow-MN in this disclosure), and other parts of the QFs are configured in the SN (referred to as QoS flow-SN in this disclosure), and in the meanwhile, the UPF of the session on the 5GC side is also configured with two uplink addresses from the RAN side to the UPF. In this way, the MN and the UPF establish a set of user plane addresses for uplink and downlink data transmission, split PDU Session-MN terminated uplink address (referred to as uplink address-MN in this disclosure) and downlink address (referred to as downlink address-MN in this disclosure). The SN and the UPF also establish another set of user plane addresses for uplink and downlink data transmission, PDU Session-SN terminated uplink address (referred to as uplink address-SN in this disclosure) and downlink address (referred to as downlink address-SN in this disclosure).

In 5G, in the downlink, the user plane of the core network sends data to the base station. At the New Radio (NG) interface (the interface between the core network and the RAN), the core network sends the data to the RAN in the form of QF, and the RAN maps QF into DRB and sends it to UE. In the uplink, the UE sends data, which is carried on the DRB, to the RAN, and the base station maps the data on the DRB into QF data packets and sends them to the core network. Therefore, the RAN is configured with a mapping function module to map QF to DRB (or vice versa, DRB to QF). The Service Data Adaptation Protocol (SDAP) sublayer is responsible for mapping the QoS flow to the corresponding DRB; one or more QoS flows can be mapped to the same DRB. For uplink data, QF-to-DRB mapping uses two methods: Reflective mapping (wherein the UE monitors mapping rule of the downlink QoS flow to the DRB and applies it to the uplink direction) and Explicit Configuration.

For each PDU Session, a default data radio bearer (default DRB) can be configured. When the UE sends the RAN a QF data packet, which neither uses Radio Resource Control (RRC) to be configured to a DRB (i.e., Explicit Configuration) nor uses explicit configuration (i.e., Explicit Configuration), the UE will bear the QF to the default DRB. The default DRB can bear one or more QF data packets of the QF.

In a multi-connection system, taking dual connection as an example, the MN configures a certain QoS flow of a split PDU Session on the MN node and informs the core network of which RAN uplink address to receive the uplink QoS flow data packets of the QoS flow. However, the RAN did not notify the UE of which DRB the QoS flow is mapped to. In other words, there is no Explicit Configuration of the mapping relationship between the QoS flow and the DRB, and in this regard, the downlink data packet of the QoS flow is not sent to the UE from the core network via the RAN. Therefore, the UE cannot know which DRB the QoS flow is mapped to through Reflective Mapping. In this way, when the UE prepares to send the uplink QoS flow packet of the QoS flow to the core network via the RAN, the UE can only send the QoS flow packet borne on the default DRB.

But on the one hand, when the MN configures a certain QoS flow of a split PDU Session on the MN node and informs the core network to receive the uplink QoS flow packet of the QoS flow from uplink address of the MN, and on the other hand, when the default DRB is configured on the SN, the uplink data packet of the QoS flow is sent to the core network from the uplink address of the SN. The core network only knows that the uplink data packet of the QoS flow comes from the uplink address of the MN.

Figure 3:
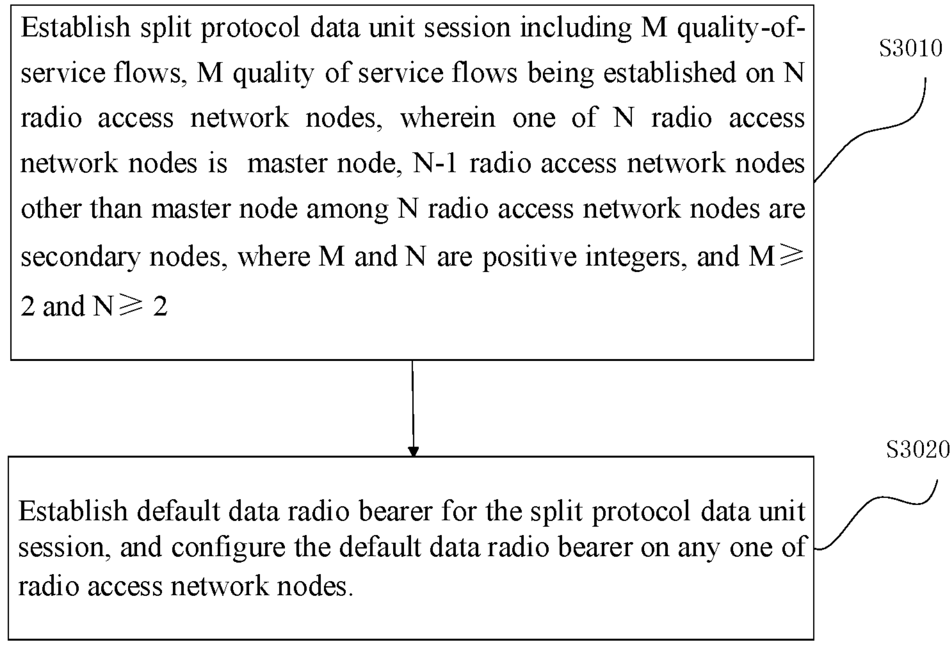
FIG. 3 is a flowchart of a data radio bearer control method in a multi-connection system according to an embodiment.

FIG. 3 is a flowchart of a data radio bearer control method in a multi-connection system according to an embodiment. As shown in FIG. 3, the method according to this embodiment includes the following steps.

Step S3010: Establish a split protocol data unit session including M quality-of-service flows, the M quality of service flows being established on N radio access network nodes, wherein one of the N radio access network nodes is a master node, N−1 radio access network nodes other than the master node among the N radio access network nodes are secondary nodes, where M and N are positive integers, and M≥2 and N≥2.

The data radio bearer control method in the multi-connection system according to this embodiment can be applied to the RAN device in the network, and can be the MN in the multi-connection system. For a UE, the network side establishes a PDU session for the UE, and the PDU session includes M QFs. The RAN device as the MN decides to establish the respective QF of the PDU session on the N RAN nodes, that is, decides to establish a split PDU session. Herein, the split PDU session includes M QFs, M QFs are established on N respective RAN nodes, one of the N RAN nodes is the master node (MN), and N−1 RAN nodes other than the master node in the N RAN nodes are secondary nodes (SNs), wherein M and N are positive integers, M≥2 and N≥2. The MN knows the uplink address of each split PDU session-SN and sends it to a corresponding SN by an SN establishment request message or an SN modification request message.

In the RAN nodes, when N=2, it is a dual-connection system, wherein one RAN node is MN and the other one is SN; in the RAN nodes, when N>2, it is a multi-connection system, wherein one RAN node is MN, and the remainders are SN. For the convenience of description, in this disclosure, the number of SNs is set to k. In this regard, k SNs and 1 MN form (k+1) RAN nodes, namely: N=k+1. When k=1 which represents one SN, N=2 and it is a dual-connection system for this time; when k>1, N>2 and it is a multi-connection system for this time.

For this PDU session, the MN decides to split it, that is, to establish a split PDU session. The MN decides to split and establish the QoS flow (QF1, QF2, QF3 . . . ) of the PDU session on the MN and SN. The QoS flow established on the MN is also called Split PDU Session-MN terminated. For the convenience of description in this disclosure, it is called: QoS flow-MN. The QoS flow established on the SN is also called Split PDU Session-SN terminated. For the convenience of description in this disclosure, it is called: QoS flow-SN. When there are multiple SNs, i.e., in a multi-connection system, it is further called QoS flow-SN(k), where k is the number of SNs.

For example, PDU Session ID=A: {QFI=1, QFI=2, . . . QFI=a, . . . QFI=b, . . . QFI=c, . . . }, when N=2 and k=1, this is a dual-connection system: QoS flow-MN={QFI=1, QFI=2, . . . }; QoS flow-SN={QFI=a,QFI=b, . . . }; when N>2 and k>1, it is a multi-connection system: QoS flow-MN={QFI=1,QFI=2, . . . }; QoS flow-SN(1)={QFI=a, QFI=b, . . . }; QoS flow-SN(2)={QFI=c,QFI=d, . . . }; on QoS flow (i.e., QoS flow-MN or QoS flow-SN in this disclosure) belonging to the same split PDU session for each RAN node (including MN and SN), an uplink user plane connection (in this disclosure, only uplink address of the user plane, referred to as the uplink address, is involved) and a downlink user plane connection are established.

The QoS flow established on the MN is also called Split PDU Session-MN terminated. In this disclosure, the uplink address is called the uplink address-MN, and the downlink address is called the downlink address-MN. The QoS flow established on the SN is also called Split PDU Session-SN terminated. In this disclosure, the uplink address is called the uplink address-SN, and the downlink address is called the downlink address-SN.

When there is one SN, its uplink address is called uplink address-SN, and its downlink address is called downlink address-SN in this disclosure. When there are multiple SNs, the uplink and downlink addresses of each SN are called uplink address-SN (1), downlink address-SN (1); uplink address-SN (2), downlink address-SN (2); . . . uplink address-SN(k), downlink address-SN(k), where: k is the number of SNs. The MN knows the uplink address (uplink address-SN) of each SN in advance, and sends it to the respective SN through the SN establishment request message/SN modification request message.

Step S3020: Establish a default data radio bearer for the split protocol data unit session, and configure the default data radio bearer on any one of radio access network nodes.

After the split PDU session is established, the MN establishes a default DRB for the split PDU session. The default DRB is configured on any RAN node, which can be the MN or any SN. When the default DRB is configured on the MN, since the MN has known various information related to the split PDU session, the MN does not need to process it. When the default DRB is configured on the SN, the MN needs to send the uplink addresses of the N Radio Access Network nodes of the split Protocol Data Unit session and the M Quality of Service flow identifiers to the radio access network node of the default data radio bearer.

Each PDU Session, including Non-split PDU Session and split PDU Session, can establish at most one default DRB. This disclosure only involves split PDU Session. The RAN node configured with the default DRB may be MN or SN, but it can only be one RAN node. The MN notifies the SN, and the method for the SN configured with the default DRB can be explicit or implicit notification. In the case of explicit notification, the MN sends an indication message to a certain RAN node, such as default DRB={true, false}. If true, it means that the default DRB is configured on the RAN node, and if false, it means that the default DRB is not configured on the RAN node.

In the case of explicit notification, the MN sends SN establishment request message/SN modification request message to the SN, and sends the configuration information of the default DRB to the corresponding SN; or the MN sends configuration information of the default DRB to the corresponding SN through an inter-node container of RAN nodes including the configuration information of the default DRB. When the default DRB is configured in the SN, for the dual-connection system, the MN needs to notify the SN that is configured with the default DRB, and the MN also needs to send the uplink address of QoS flow-MN to the SN; when the default DRB is configured in the SN, for the multi-connection system, the MN needs to notify SN(j) that is configured with the default DRB, and the MN also needs to send uplink address of RAN node (which can be an MN, or one or more SNs) bearing the QoS flow of the split PDU session and the QFI of the borne split PDU session to the SN(j).

When the MN decides that the default DRB is configured in the SN, whether it is a dual-connection system with only one SN or a multi-connection system with multiple SNs (k>1, wherein k is the number of SNs), only one SN is configured with the default DRB. In the dual-connection system with one SN, the MN sends the uplink address (uplink address-MN) of the QoS flow-MN to the SN; in the multi-connection system with multiple SNs (k>1, wherein k is the number of SNs), only one SN is configured with the default DRB (in this disclosure, for the purpose of the description of the method, the SN configured with the default DRB is referred to as SN(j)). The MN sends the uplink address of the RAN bearing the QoS flow of the split PDU session to the SN(j). For example, if the MN bears the QoS flow of the split PDU session, the MN sends the uplink address of QoS flow-MN to the SN(j); if one or more SNs bear the QoS flow of the split PDU session, the MN sends the uplink address of the QoS flow-SN(i) and the QFI of the borne split PDU session to the SN(j). The MN sends the uplink address of the QoS flow-MN and the uplink addresses of other QoS flow-SN(i) to SN(j). When the number of SNs=k, where the default DRB is configured on SN(j), the MN also needs to send the uplink address-SN of other SNs to the SN(j). In this way, SN(j) can receive the uplink address-MN and uplink addresses-SN of all the SNs (k SNs).

In consideration of the compatibility of subsequent processes, a unified method of sending uplink address can be determined for the dual-connection system and the multi-connection system, i.e.: setting a RAN uplink address list. RAN uplink address list={RAN(1) uplink address, QFI list}, {RAN(2) uplink address, QFI list}, . . . {RAN(i) uplink address, QFI list}. Herein, RAN(i) can be either MN or SN, and refers to a certain RAN node that bears a part of the QoS flows of the split PDU session. The QFI list refers to a list of one or more QoS flows bearing the split PDU session on the RAN node. In other words, the QFI list can be one QoS flow or more QoS flows.

Because the default DRB is established on any RAN node for the split PDU session and the radio access point configured with the default Data Radio Bearer is notified of N radio access network nodes' uplink addresses and M QoS flow identifiers of the split Protocol Data Unit session, the RAN configured with the default DRB, whether it is MN or SN, has all the uplink addresses of the RAN, so that after the RAN configured with the default DRB receives the data sent from the UE, the QF is sent to the CN through the corresponding uplink address according to a correspondence of uplink data of each QF to uplink address of RAN. As such, possible problems in QF transmission caused by inconsistent uplink addresses of CN and RAN can be avoided.

If the MN configures the default DRB on the SN, the MN sends an SN establishment request message or SN modification request message to the SN configured with the default DRB, which includes: the uplink address of each RAN node (including the uplink address of the MN, the uplink address of the SN, the uplink address of other SNs (for the multi-connection system, the part of QoS flows of the split PDU Session is established on the other SNs) and information of the default DRB configured in the SN. Alternatively, the MN can also establish the default Data Radio Bearer for the split Protocol Data Unit session through the Secondary Node establishment request message, and then the MN configures the SN node's uplink address for the SN through the SN modification request message. The message includes: uplink address of the RAN node bearing the QoS flows of the split PDU session (for the multi-connection system, the part of QoS flows of the split PDU Session is established on the other SNs) and information of the default DRB configured in the SN.

The data radio bearer control method in the multi-connection system according to this embodiment establishes a split protocol data unit session. The split protocol data unit session includes M quality of service flows, and the M quality of service flows are established on N radio access network nodes, respectively, to establish the default data radio bearer for the split protocol data unit session and to configure the default data radio bearer on any radio access network node. Because the default DRB is established on any RAN node for the split PDU session, when the RAN node that establishes the default DRB is the MN, the MN has all the uplink addresses of the RAN since the MN stores the uplink addresses of N radio access network nodes and M quality of service flow identifiers. In this way, after the RAN configured with the default DRB receives the data sent from the UE, the QF is sent to the CN through the corresponding uplink address according to a correspondence of uplink data of each QF to uplink address of RAN. As such, possible problems in QF transmission caused by inconsistent uplink addresses of CN and RAN can be avoided.

In an embodiment, when the default DRB is configured on the SN, if the MN decides that the default DRB is no longer configured on the RAN node, the MN sends a configuration update message to the SN, wherein the configuration update message includes: indicating SN no longer to configure default DRB. The SN receives indication information in the configuration update message and learns no longer to configure the default DRB. In addition, when the uplink address of the RAN node that bears the QoS flow of the split PDU Session changes, the MN sends an address update message to the SN, wherein the address update message includes: updated uplink address of RAN node.

When the RAN node configured with the default DRB is an SN, including an SN in dual-connection, or an SN (SN(j)) in multi-connection, the MN sends the configuration information of the default DRB to the SN configured with the default DRB. The configuration information of the default DRB can be only an indication information, such as default DRB={true, false}. If true, it means that the default DRB is configured on the RAN node, and if false, it means that the default DRB is not configured on the RAN node. When the default DRB of a PDU Session is configured on a certain RAN node and the uplink addresses of other RAN nodes change, the MN decides to send the updated uplink addresses of other nodes to the RAN node configured with DRB. For the dual-connection system and the multi-connection system, the MN can know the updated uplink address of each RAN node. For a dual connection system, when the default DRB is configured on the SN, the MN sends updated uplink address-MN to the SN. For a multi-connection system, when the default DRB is configured on a certain SN, the MN sends updated uplink address-MN and updated uplink address-SN list (other SNs) to the SN configured with the default DRB.

In an embodiment, when the MN decides to establish the default DRB on the SN, in order to ensure more timely transmission the data of the UE and CN, the MN informs the terminal of indication information that the default DRB is established on the corresponding SN. The indication information includes at least RAN node information of the SN. The RAN node information of the SN can be cell ID information of the RAN. When the terminal receives the indication information that the default DRB is established on the SN, the terminal preferentially selects a data link to the SN to send the uplink information during uplink data transmission. When the MN changes the configuration established by the default DRB, the MN notifies the terminal of indication information that the default DRB configuration is changed. When the terminal receives the indication information that the default DRB configuration is changed, the terminal preferentially selects a data link to the MN or SN where the default DRB configuration is changed for uplink data transmission.

Figure 4:
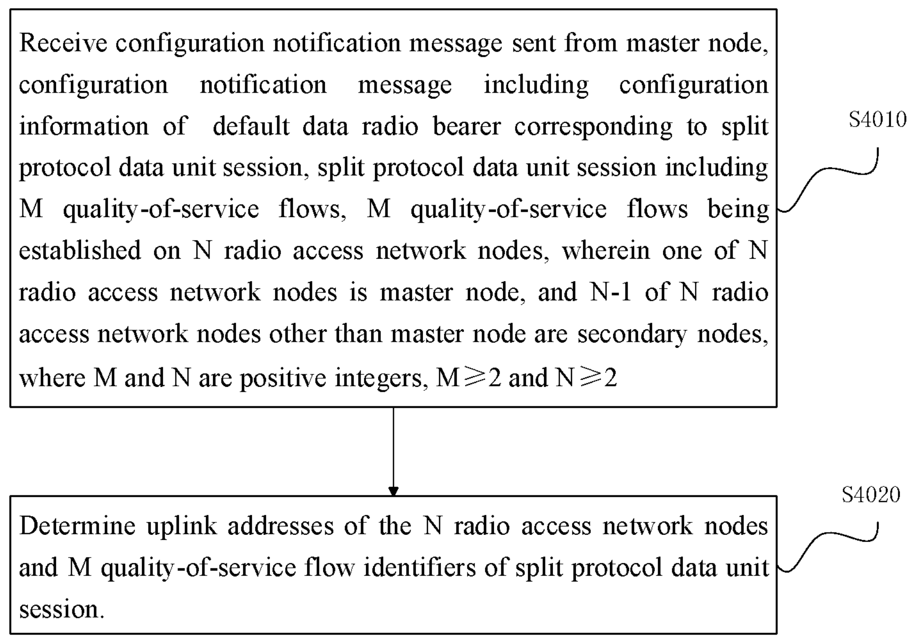
FIG. 4 is a flowchart of another data radio bearer control method in a multi-connection system according to an embodiment.

FIG. 4 is a flowchart of another data radio bearer control method in a multi-connection system according to an embodiment. As shown in FIG. 4, the method according to this embodiment includes the following steps.

Step S4010: Receive a configuration notification message sent from a master node, the configuration notification message including configuration information of a default data radio bearer corresponding to a split protocol data unit session, the split protocol data unit session including M quality-of-service flows, the M quality-of-service flows being established on N radio access network nodes, respectively, wherein one of the N radio access network nodes is the master node, and N−1 of the N radio access network nodes other than the master node are secondary nodes, where M and N are positive integers, M≥2 and N≥2.

The data radio bearer control method in the multi-connection system according to this embodiment is applied to the RAN device in the network. For a UE, the network side establishes a PDU session for the UE, and the PDU session includes M QFs. The RAN device as the MN decides to establish the QF of the PDU session on the N RAN nodes, respectively, that is, decides to establish a split PDU session. The split PDU session includes M QFs, M QFs are established on N RAN nodes, respectively, one of the N RAN nodes is the master node, and the N−1 RAN nodes other than the master node in N RAN nodes are secondary nodes, where M and N are positive integers, M≥2 and N≥2. Subsequently, the MN establishes a default data radio bearer for the split protocol data unit session. When the default DRB established by the MN is configured on the SN, the SN will receive the configuration notification message sent from the MN. The configuration notification message includes the configuration information of the default data radio bearer corresponding to split protocol data unit session. The configuration information includes the uplink addresses of N radio access network nodes and M quality-of-service flow identifiers of the protocol data unit session split from the radio access point of the default data radio bearer.

Step S4020: Determine uplink addresses of the N radio access network nodes and M quality-of-service flow identifiers of the split protocol data unit session.

After receiving the configuration information of the default PDU sent from the MN, the SN reads the configuration information and determines the uplink addresses of the N radio access network nodes and M service-of-quality flow identifiers of the split protocol data unit session. Then the SN has all the uplink addresses of the RAN, so that after the RAN configured with the default DRB receives the data sent from the UE, the QF can be sent to the CN through the corresponding uplink address according to the uplink data of each QF and the corresponding uplink address of the RAN. In this way, possible problems in QF transmission caused by inconsistent uplink addresses in CN and RAN are avoided.

In an embodiment, the step of receiving the configuration notification message sent from the master node includes: receiving a secondary node establishment request message sent from the master node, wherein the secondary node establishment request message is configured to establish the default data radio bearer for the split protocol data unit session, and the secondary node establishment request message includes the uplink address and the quality of service flow identifier of the secondary node configured with the default data radio bearer; and then receiving a secondary node modification request message sent from the master node, wherein the secondary node modification request message includes uplink addresses of other radio access network nodes except for the secondary node configured with the default data radio bearer and other quality-of-service flow identifiers of the split protocol data unit session.

In an embodiment, the step of receiving the configuration notification message sent from the master node includes: receiving a secondary node establishment request message or a secondary node modification request message sent from the master node, wherein the secondary node establishment request message or the secondary node modification request message is configured to establish the default data radio bearer for the split protocol data unit session, and the secondary node establishment request message or the secondary node modification request message includes the uplink addresses of the N radio access network nodes and M quality-of-service flow identifiers of the split protocol data unit session.

In an embodiment, when the default DRB is configured on the SN, the SN can further receive a configuration update message sent from the master node, wherein the configuration update message is configured to indicate the secondary node configured with the default data radio bearer to no longer configure the data radio bearer. The SN receives the indication information in the configuration update message and knows that it no longer configures the default DRB. In addition, when the uplink address of the RAN node that bears the QoS flow of the split PDU Session changes, the SN may further receive an address update message sent from the MN, and the address update message includes an updated uplink address of RAN node.

Figure 5:
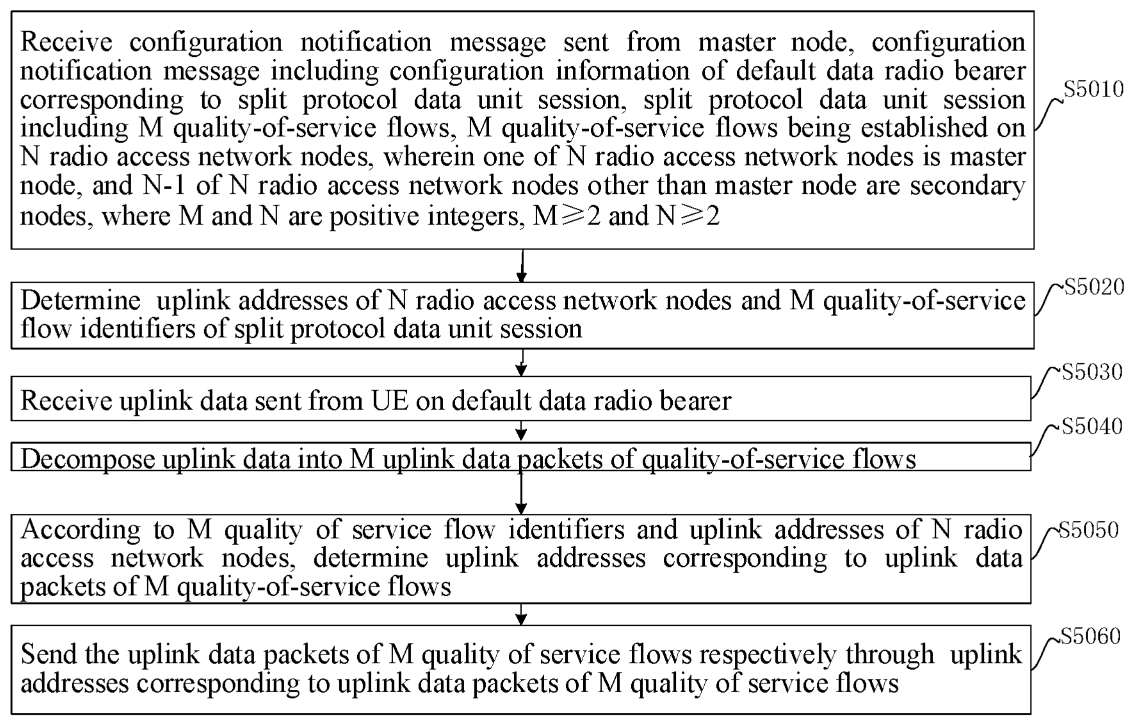
FIG. 5 is a flowchart of another data radio bearer control method in a multi-connection system according to an embodiment.

FIG. 5 is a flowchart of another data radio bearer control method in a multi-connection system according to an embodiment. As shown in FIG. 5, the method provided in this embodiment includes the following steps.

Step S5010: Receive a configuration notification message sent from the master node, the configuration notification message including configuration information of the default data radio bearer corresponding to the split protocol data unit session, the split protocol data unit session including M quality-of-service flows, the M quality-of-service flows being established on N radio access network nodes, wherein one of the N radio access network nodes is the master node, and N−1 of the N radio access network nodes other than the master node are secondary nodes, where M and N are positive integers, M≥2 and N≥2.

Step S5020: Determine the uplink addresses of the N radio access network nodes and M quality-of-service flow identifiers of the split protocol data unit session.

Step S5030: Receive the uplink data sent from the UE on the default data radio bearer.

Step S5040: Decompose the uplink data into M uplink data packets of quality-of-service flows.

Step S5050: According to the M quality of service flow identifiers and the uplink addresses of the N radio access network nodes, determine the uplink addresses corresponding to the uplink data packets of the M quality-of-service flows.

Step S5060, Send the uplink data packets of the M quality of service flows, respectively, through the uplink addresses corresponding to the uplink data packets of the M quality of service flows.

Figure 6:
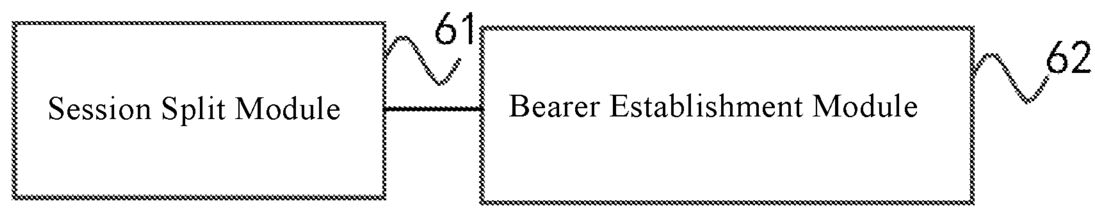
FIG. 6 is a block diagram of a network device in a multi-connection system according to an embodiment.

FIG. 6 is a block diagram of a network device in a multi-connection system according to an embodiment. As shown in FIG. 6, the network device in the multi-connection system according to this embodiment includes: a session split module 61 configured to establish a split protocol data unit session including M quality-of-service flows, the M quality of service flows being established on N radio access network nodes, wherein one of the N radio access network nodes is a master node, N−1 radio access network nodes other than the master node among the N radio access network nodes are secondary nodes, where M and N are positive integers, and M≥2 and N≥2; and a bearer establishment module 62 configured to establish a default data radio bearer for the split protocol data unit session and configure the default data radio bearer on any one of radio access network nodes.

The network device in the multi-connection system according to this embodiment is used to implement the data radio bearer control method in the multi-connection system according to the embodiment shown in FIG. 3. The implementation principles and technical effects of the network device in the multi-connection system according to this embodiment are similar to the method embodiment and will not repeat herein again.

Figure 7:
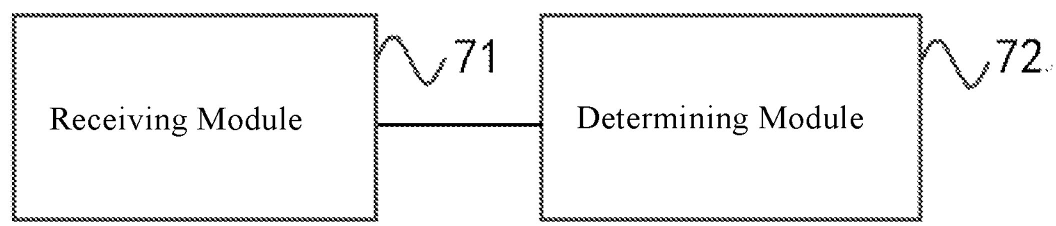
FIG. 7 is a block diagram of a network device in another multi-connection system according to an embodiment.

FIG. 7 is a block diagram of a network device in another multi-connection system according to an embodiment. As shown in FIG. 7, the network device in the multi-connection system according to this embodiment includes: a receiving module 71, configured to receive a configuration notification message sent from a master node, the configuration notification message including configuration information of a default data radio bearer corresponding to a split protocol data unit session, the split protocol data unit session including M quality-of-service flows, the M quality-of-service flows being established on N radio access network nodes, wherein one of the N radio access network nodes is a master node, and N−1 of the N radio access network nodes other than the master node are secondary nodes, where M and N are positive integers, M≥2 and N≥2; a determining module 72, configured to determine uplink addresses of the N radio access network nodes and M quality of service flow identifiers of the split protocol data unit session.

The network device in the multi-connection system according to this embodiment is used to implement the data radio bearer control method in the multi-connection system according to the embodiment shown in FIG. 4. The implementation principles and technical effects of the network device in the multi-connection system according to this embodiment are similar to the method embodiment and will not repeat herein again.

Figure 8:
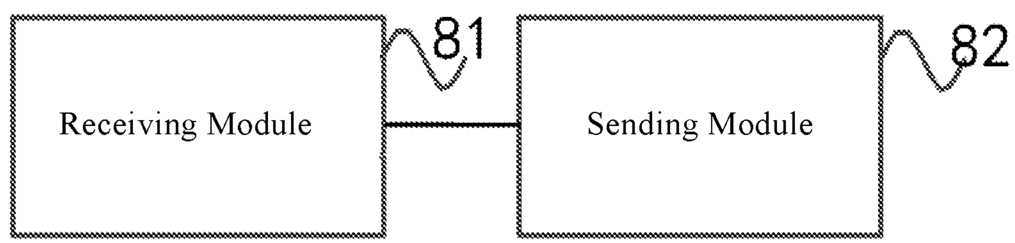
FIG. 8 is a block diagram of a terminal in a multi-connection system according to an embodiment.

FIG. 8 is a block diagram of a terminal in another multi-connection system according to an embodiment. As shown in FIG. 8, the terminal in the multi-connection system according to this embodiment includes: a receiving module 81, configured to receive default data radio bearer establishment instruction information, the default data radio bearer establishment instruction information including information of a secondary node configured with a default data radio bearer; and a sending module 82, configured to send uplink information in a split protocol data unit session through a data link to the secondary node configured with the default data radio bearer.

An embodiment of the present disclosure further provides a data radio bearer control system in a multi-connection system. The data radio bearer control system in the multi-connection system includes N radio access network nodes, wherein one of the N radio access network nodes is a master node, and N−1 radio access network nodes other than the master node among the N radio access network nodes are secondary nodes; the master node can include the network device in the multi-connection system according to the embodiment as shown in FIG. 6; the secondary nodes can include the network device in the multi-connection system according to the embodiment as shown in FIG. 7.

In an embodiment, the data radio bearer control system in the multi-connection system according to the embodiment of the present disclosure further includes the terminal in the multi-connection system in the embodiment as shown in FIG. 6.

It should be understood by those skilled in the art that the term "user terminal" used herein encompasses any suitable type of wireless user equipment, such as a mobile phone, a portable data processing device, a portable web browser, or a vehicle-mounted mobile station.

In general, the various embodiments of the present disclosure can be implemented in hardware or dedicated circuits, software, logic or any combination thereof. For example, some aspects can be implemented in hardware, while other aspects can be implemented in firmware or software that may be executed by a controller, microprocessor, or other computing device, although the present application is not limited thereto.

The embodiments of the present disclosure can be implemented by executing computer program instructions by a data processor of a mobile device, for example, in a processor entity, or by hardware, or by a combination of software and hardware. The computer program instructions can be assembly instructions, InstructionSet Architecture (ISA) instructions, machine instructions, machine-related instructions, microcode, firmware instructions, state setting data, or source code or object code written in any combination of one or more programming languages.

The block diagram of any logic flow in the drawings of the present disclosure may represent program steps, or may represent interconnected logic circuits, modules, and functions, or may represent a combination of program steps and logic circuits, modules, and functions. The computer program can be stored on the memory. The memory can be of any type suitable for the local technical environment and can be implemented by any suitable data storage technology, including but not limited to Read-Only Memory (ROM), Random Access Memory (RAM), optical Memory devices and systems (Digital Video Disc (DVD) or Compact Disc (CD)), etc. Computer-readable media may include non-transitory storage media. The data processor can be any type suitable for the local technical environment, for example, including but not limited to general-purpose computer, special-purpose computer, microprocessor, Digital Signal Processor (DSP), Application Specific Integrated Circuit (ASIC), programmable logic device (Field-Programmable Gate Array, FGPA), and processor based on multi-core processor architecture.

What is claimed is:

1. A data radio bearer control method in a multi-connection system, comprising:

establishing a split protocol data unit session including M quality-of-service flows, the M quality of service flows being established on N radio access network nodes, wherein one of the N radio access network nodes is a master node, N−1 radio access network nodes other than the master node among the N radio access network nodes are secondary nodes, where M and N are positive integers, and M≥2 and N≥2; and establishing a default data radio bearer for the split protocol data unit session, and configuring the default data radio bearer on any one of radio access network nodes;

wherein in the case that a radio access network node configured with a default data radio bearer is a secondary node, the method further comprises:

sending uplink addresses of the N radio access network nodes and M quality-of-service flow identifiers of the split protocol data unit session to the radio access network node of the default data radio bearer;

wherein the uplink addresses of the N radio access network nodes comprises an uplink address of the secondary node configured with the default data radio bearer.

2. The method according to claim 1, wherein, in the case that the radio access network node configured with the default data radio bearer is the master node, the master node obtains M service-of-quality flow identifiers, and reads pre-stored uplink addresses of N radio access network nodes, and wherein after the step of establishing a default data radio bearer for the split protocol data unit session, and configuring the default data radio bearer on any one of radio access network nodes, the method further comprises:

sending uplink data packets of the M quality-of-service flows through uplink addresses corresponding to the uplink data packets of the M quality-of-service flows, respectively.

3. The method according to claim 1, wherein the step of sending the uplink addresses of the N radio access network nodes and the M quality-of-service flow identifiers of the split protocol data unit session to the radio access network node of the default data radio bearer, comprising:

establishing the default data radio bearer for the split protocol data unit session through a secondary node establishment request message, and configuring the default data radio bearer on any secondary node, the secondary node establishment request message including the uplink address and the quality-of-service flow identifier of the secondary node configured with the default data radio bearer; and sending the uplink addresses of other radio access network nodes and other quality-of-service flow identifiers of the split protocol data unit session to the secondary node configured with the default data radio bearer through a secondary node modification request message.

4. The method according to claim 3, further comprising:

sending a configuration update message to the secondary node configured with the default data radio bearer, wherein the configuration update message is configured to indicate the secondary node configured with the default data radio bearer to no longer configure the default data radio bearer.

5. The method according to claim 3, further comprising:

when the uplink address of the radio access network node bearing the split protocol data unit session changes, sending an address update message to the radio access network node which uplink address changes.

6. The method according to claim 3, further comprising:

sending default data radio bearer establishment instruction information to a user equipment UE corresponding to the split protocol data unit session, the default data radio bearer establishment instruction information including information of the secondary node configured with the default data radio bearer.

7. The method according to claim 6, further comprising:

in the case that configuration of the default data radio bearer changes, sending default data radio bearer change instruction information to the UE corresponding to the split protocol data unit session, the default data radio bearer change instruction information including information of the secondary node configured with a changed default data radio bearer.

8. The method according to claim 1, wherein the step of sending the uplink addresses of the N radio access network nodes and the M quality-of-service flow identifiers of the split protocol data unit session to the radio access network node of the default data radio bearer, comprising:

establishing the default data radio bearer for the split protocol data unit session through a secondary node establishment request message or through a secondary node modification request message, and configuring the default data radio bearer on any secondary node, the secondary node establishment request message or the secondary node modification request message including the uplink addresses of the N radio access network nodes and M quality-of-service flow identifiers of the split protocol data unit session.

9. A network device in a multi-connection system, comprising a processer and a memory storing instructions, wherein the instructions are configured to, when executed by the processor, carry out the method of claim 1.

10. A data radio bearer control method in a multi-connection system, comprising:

receiving a configuration notification message sent from a master node, the configuration notification message including configuration information of a default data radio bearer corresponding to a split protocol data unit session, the split protocol data unit session including M quality-of-service flows, the M quality-of-service flows being established on N radio access network nodes, wherein one of the N radio access network nodes is the master node, and N−1 of the N radio access network nodes other than the master node are secondary nodes, where M and N are positive integers, M≥2 and N≥2; and determining uplink addresses of the N radio access network nodes and M quality-of-service flow identifiers of the split protocol data unit session;

wherein the uplink addresses of the N radio access network nodes comprises an uplink address of the secondary node configured with the default data radio bearer.

11. The method according to claim 10, wherein after the step of determining the uplink addresses of the N radio access network nodes and M quality-of-service flow identifiers of the split protocol data unit session, the method further comprises:

sending uplink data packets of the M quality-of-service flows through uplink addresses corresponding to the uplink data packets of the M quality-of-service flows, respectively.

12. The method according to claim 10, wherein the step of receiving the configuration notification message sent from the master node, comprises:

receiving a secondary node establishment request message sent from the master node, wherein the secondary node establishment request message is configured to establish the default data radio bearer for the split protocol data unit session, and the secondary node establishment request message includes the uplink address and the quality of service flow identifier of the secondary node configured with the default data radio bearer; and receiving a secondary node modification request message sent from the master node, wherein the secondary node modification request message includes uplink addresses of other radio access network nodes other than the secondary node configured with the default data radio bearer and other quality-of-service flow identifiers of the split protocol data unit session.

13. The method according to claim 10, wherein the step of receiving the configuration notification message sent from the master node, comprises:

receiving a secondary node establishment request message or a secondary node modification request message sent from the master node, wherein the secondary node establishment request message or the secondary node modification request message is configured to establish the default data radio bearer for the split protocol data unit session, and the secondary node establishment request message or the secondary node modification request message includes the uplink addresses of the N radio access network nodes and M quality-of-service flow identifiers of the split protocol data unit session.

14. The method according to claim 10, further comprising:

receiving a configuration update message sent from the master node, wherein the configuration update message is configured to indicate the secondary node configured with the default data radio bearer to no longer configure the default data radio bearer.

15. The method according to claim 10, further comprising:

receiving an address update message sent from the master node, wherein the address update message includes an updated uplink address.

16. A network device in a multi-connection system, comprising a processer and a memory storing instructions, wherein the instructions are configured to, when executed by the processor, carry out the method of claim 10.

* * * * *